(12) United States Patent
Sattler et al.

(10) Patent No.: US 8,875,574 B2
(45) Date of Patent: Nov. 4, 2014

(54) COUPLING STRUCTURE FOR A YAW RATE SENSOR DEVICE, YAW RATE SENSOR DEVICE, AND METHOD FOR THE PRODUCTION THEREOF

(75) Inventors: Robert Sattler, Regensburg (DE); Daniel Christoph Meisel, Vaihingen an der Enz (DE); Joerg Hauer, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 699 days.

(21) Appl. No.: 13/120,276

(22) PCT Filed: Aug. 5, 2009

(86) PCT No.: PCT/EP2009/060131
§ 371 (c)(1),
(2), (4) Date: Aug. 10, 2011

(87) PCT Pub. No.: WO2010/034556
PCT Pub. Date: Apr. 1, 2010

(65) Prior Publication Data
US 2011/0283794 A1    Nov. 24, 2011

(30) Foreign Application Priority Data
Sep. 25, 2008   (DE) .......................... 10 2008 042 369

(51) Int. Cl.
*G01C 19/56*    (2012.01)
*B23P 11/00*    (2006.01)

(52) U.S. Cl.
CPC ...................................... *G01C 19/56* (2013.01)
USPC .......................................... 73/504.12; 29/428

(58) Field of Classification Search
USPC ....................................................... 73/504.12
See application file for complete search history.

(56) References Cited

U.S. PATENT DOCUMENTS

| | | | |
|---|---|---|---|
| 5,908,986 A | * | 6/1999 | Mitamura .................. 73/504.12 |
| 5,945,599 A | | 8/1999 | Fujiyoshi et al. |
| 2006/0219006 A1 | * | 10/2006 | Nasiri et al. ............... 73/504.12 |

FOREIGN PATENT DOCUMENTS

| CN | 1802550 | 7/2006 |
|---|---|---|
| CN | 101270989 | 9/2008 |
| EP | 1 930 692 | 6/2008 |
| JP | 10-170276 | 6/1998 |
| JP | 11-190635 | 7/1999 |
| JP | 11-304834 | 11/1999 |
| WO | WO 2007/104742 | 9/2007 |

* cited by examiner

*Primary Examiner* — Hezron E Williams
*Assistant Examiner* — Gregory J Redmann
(74) *Attorney, Agent, or Firm* — Kenyon & Kenyon LLP

(57) ABSTRACT

A coupling structure for a rotation rate sensor apparatus, having at least one first oscillating mass; and having a first frame, surrounding the first oscillating mass, to which the first oscillating mass is coupled; the first frame encompassing four angle elements, each of which angle elements has at least one first limb and one second limb and is respectively coupled with the first limb and with the second limb to another adjacent angle element of the four angle elements. Also described is a further coupling structure for a rotation rate sensor apparatus, to a rotation rate sensor apparatus, to a manufacturing method for a coupling structure for a rotation rate sensor apparatus, and to a manufacturing method for a rotation rate sensor apparatus.

7 Claims, 16 Drawing Sheets

COUPLING STRUCTURE FOR A YAW RATE SENSOR DEVICE, YAW RATE SENSOR DEVICE, AND METHOD FOR THE PRODUCTION THEREOF

FIELD OF THE INVENTION

The present invention relates to coupling structures for a rotation rate sensor apparatus, and to manufacturing methods for such coupling structures. The invention further relates to a rotation rate sensor apparatus and to a manufacturing method for a corresponding rotation rate sensor apparatus.

BACKGROUND INFORMATION

A rotation rate sensor is often attached to a rotatable object in order to measure a rotation rate of a rotary motion of the object. A conventional rotation rate sensor generally has at least one first oscillating mass and one second oscillating mass (seismic mass), to which linear oscillatory motions can be imparted by a drive system. The drive system is designed so that the first oscillating mass and the second oscillating mass oscillate with a 180-degree phase offset from one another (antiparallel). The oscillating motions of the first oscillating mass and the second oscillating mass are therefore often also referred to as antiphase motions.

If the object, having the rotation rate sensor disposed thereon, executes a rotary motion about a rotation axis not parallel to the oscillation direction of the oscillating masses, with simultaneous excitation of the two oscillating masses to perform their antiparallel oscillating motions, Coriolis forces then act on the two oscillating masses as they oscillate. The Coriolis forces cause the two oscillating masses each to be deflected perpendicular to their oscillation direction. The two oscillating masses are deflected in opposite directions because of the antiparallelism of the oscillating motions of the two oscillating masses.

The deflection of an oscillating mass is proportional to the Coriolis force acting on the oscillating mass. The deflection of the oscillating mass thus corresponds to the rotation rate of the rotary motion of the object. The rotation rate of the rotary motion can therefore be ascertained by evaluating the deflection of the oscillating mass.

To prevent an acceleration acting on the rotating object from resulting in an incorrectly determined rotation rate, a conventional rotation rate sensor is usually designed to detect the respective deflections of the two oscillating masses and compare them to one another. Only if the deflection of the first oscillating mass corresponds to the negative deflection of the second oscillating mass can it be assumed that the deflections of the two oscillating masses are based on Coriolis forces and not on an acceleration of the rotatable object.

A prerequisite for such an evaluation of the deflections of the two oscillating masses is, however, that the oscillating masses be reliably capable of being caused to perform antiparallel oscillating motions by the drive system. Manufacturing a drive system that approximately meets this prerequisite is, however, relative labor-intensive and comparatively costly. In addition, in a conventional rotation rate sensor deviations often occur from the desired antiparallelism of the oscillating motions of the two oscillating masses.

SUMMARY OF THE INVENTION

The exemplary embodiments and/or exemplary methods of the present invention provides coupling structures having the features described herein, a rotation rate sensor apparatus having the features described herein, manufacturing methods for a coupling structure having the features described herein, and a manufacturing method for a rotation rate sensor apparatus having the features described herein.

The coupling structures ensure effective maintenance of a desired antiparallelism of two oscillating masses that are oscillating, even in the context of an economical drive system of simple configuration.

Advantageous refinements of the coupling structure are described in the further descriptions herein.

Further features and advantages of the exemplary embodiments and/or exemplary methods of the present invention are explained below with reference to the Figures.

DETAILED DESCRIPTION

Figure 1A:
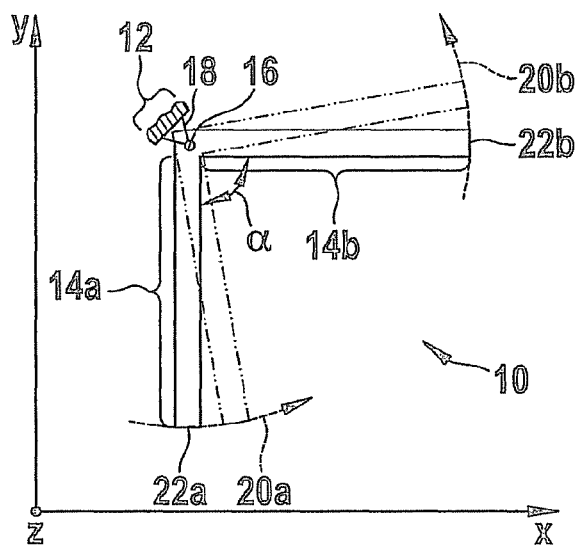
FIG. 1A, FIG. 1B, and FIG. 1C are schematic depictions of a first embodiment of the coupling structure for a rotation rate sensor apparatus, FIG. 1A depicting an angle element, FIG. 1B two mutually coupled angle elements, and FIG. 1C the coupling structure having four angle elements.
Figure 1B:
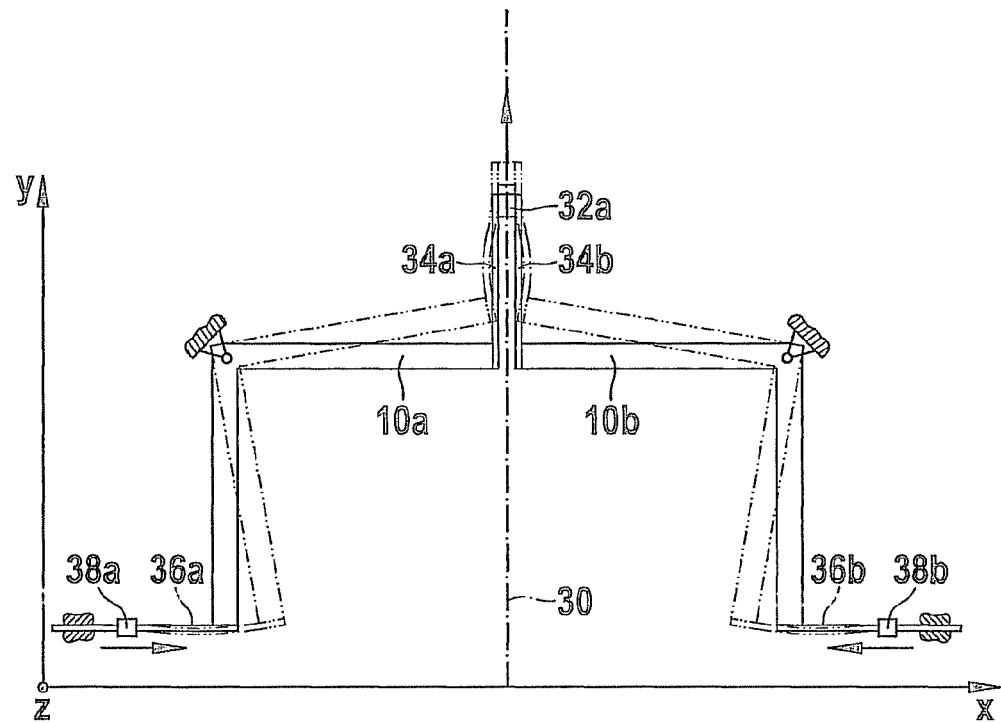
Figure 1C:
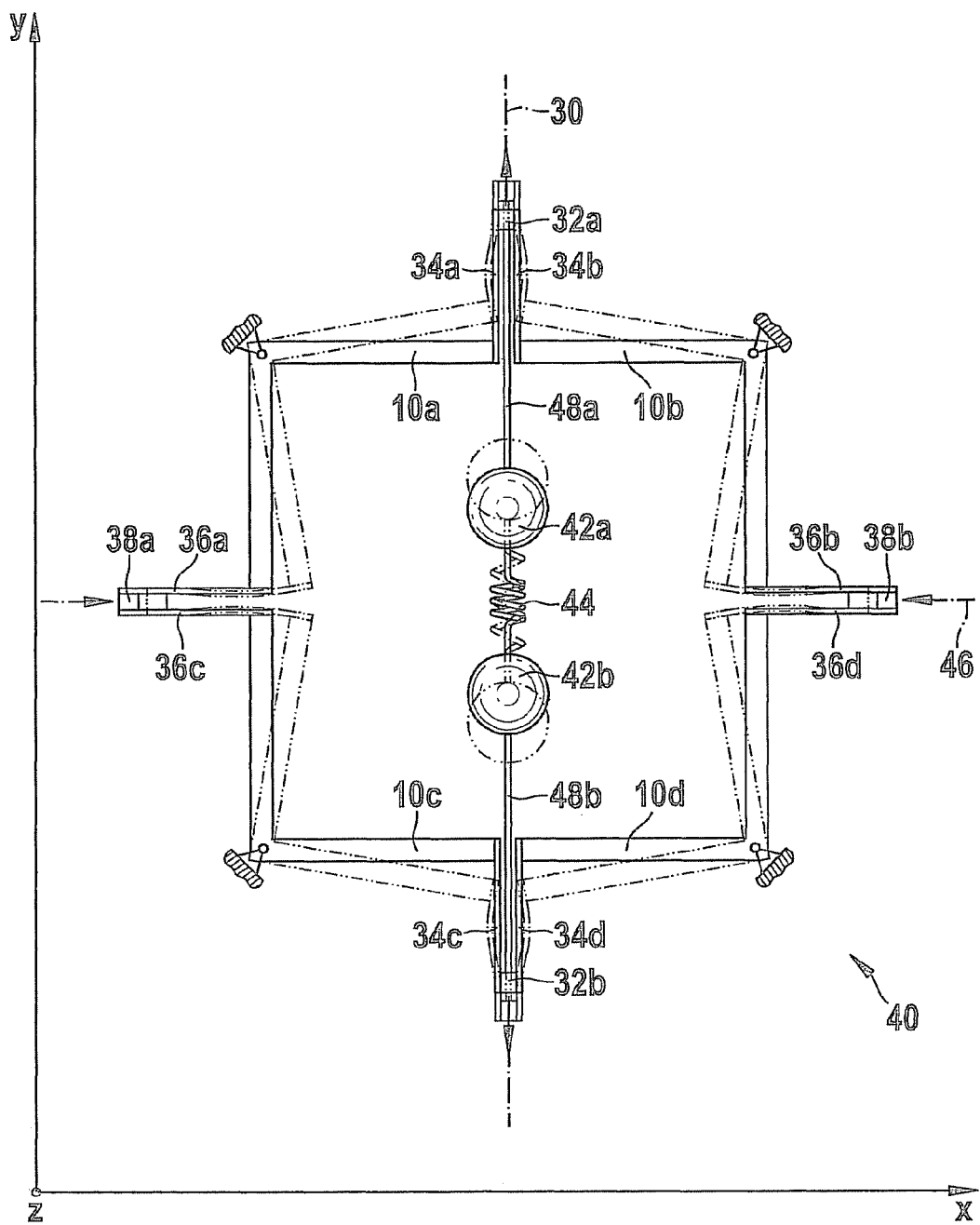

FIGS. 1A to C schematically depict a first embodiment of the coupling structure for a rotation rate sensor apparatus; FIG. 1A depicts an angle element, FIG. 1B two mutually coupled angle elements, and FIG. 1C the coupling structure having four angle elements.

Angle element 10 depicted in FIG. 1A encompasses a connecting segment 12 on which a first limb 14a and a second limb 14b are fixedly disposed. Angle element 10 may be embodied in one piece. First limb 14a is oriented at an angle α of between 60° and 120° with respect to second limb 14b. Angle α can be, in particular, between 80° and 100°. Angle α is equal, for example, to 90°. The advantages of an angle α equal to 90° will be further discussed below.

Be it noted that angle element 10 is embodied rigidly or almost rigidly. A force, below a threshold value for breakage of angle element 10, that acts on one of the two limbs 14a or 14b thus results in almost no change in angle α.

Angle element 10 is mounted rotatably at its connecting segment 12. Angle element 10 is displaced out of its initial position into at least one depicted final position.

Angle element 10 has, for example, at its connecting segment 12, a continuous opening 16 into which a hinge 18 engages. Hinge 18 is fixedly coupled onto a housing (not drawn) of the coupling structure having angle element 10. This housing is often also referred to as a "substrate." Angle element 10 may thus be rotatable about a rotation axis extending perpendicular to the two limbs 14a and 14b. Because embodiments for a suitable hinge 18, or for an attachment device for rotatable mounting of angle element 10, are known from the existing art, this subject will not be further discussed here.

Instead of using a hinge 18, it would also be conceivable for element 18 to refer to a resilient element that on the one hand is attached to rotation axis 16 and engages there, and on the other hand is attached to the substrate.

Because it is rotatably mounted, angle element 10 is embodied to convert a force acting on first limb 14a, which force produces a rotary motion 20a, about the rotation axis, of end 22a of first limb 14a facing away from connecting segment 12, into a rotary motion 20b of end 22b, located opposite connecting segment 12, of second limb 14b. A corresponding conversion is also possible in the case of a force acting on second limb 14b.

In the example shown in FIGS. 1A to C, angle α is equal to 90°, first limb 14a extends in its initial position parallel to a Y axis, and second limb 14b is aligned in its initial parallel to the X axis. Angle element 10 is thus designed to convert a motion of the first limb in the X direction into a motion of the second limb in the Y direction. The advantages of such a conversion will be discussed in further detail in the paragraphs that follow.

Angle elements 10a and 10b depicted in FIG. 1B correspond to the angle element described with reference to FIG. 1A. Their shape and their rotatable mounting will therefore not be further discussed here.

First angle element 10a and second angle element 10b are oriented mirror-symmetrically with respect to an axis of symmetry 30. Axis of symmetry 30 extends parallel to the Y axis through a contact point 32a, to which an end, adjacent to second angle element 10b, of first angle element 10a is coupled by way of a flexural spring 34a. An end, adjacent to first angle element 10a, of second angle element 10b is correspondingly also coupled onto contact point 32a by way of a flexural spring 34b.

The other ends of the two angle elements 10a and 10b are also coupled, each by way of a flexural spring 36a and 36b, onto a respective contact point 38a or 38b. The disposition of flexural springs 34a, 34b, 36a, and 36b, which can also be referred to as transverse springs, is mirror-symmetrical with respect to axis of symmetry 30.

Be it noted that at contact points 32a, 32b; 38a, 38b, the ends of the transverse springs are driven or they are freely movable. The points at which the entire structure is driven is, in contrast, entirely an open matter.

Each of the two drive points 38a and 38b is coupled to a drive system in such a way that drive points 38a and 38b can be caused to perform linear oscillating motions. Examples of a drive system of this kind are further described below. The oscillating motions of the two drive points 38a and 38b may be oriented parallel to the X axis. In particular, contact point 38a can be caused to oscillate antiparallel to drive point 38b. In this case a phase difference of 180° exists between the oscillating motions of the two drive points 38a and 38b. Such oscillating motions are therefore often also referred to as antiphase motions.

By way of flexural springs 36a and 36b, the antiparallel oscillating motions of drive points 38a and 38b are converted into rotary motions, symmetrical to one another with respect to axis of symmetry 30, of angle elements 10a and 10b. The two angle elements are displaced in this context out of their mutually mirror-symmetrical initial positions into final positions that are likewise oriented mirror-symmetrically with respect to axis of symmetry 30.

Because of the mirror-symmetrical disposition of the two transverse springs 34a and 34b, their transverse forces cancel one another out and the rotary motions of the two angle elements 10a and 10b are converted into a straight-line motion of contact point 32a along axis of symmetry 30. The two angle elements 10a and 10b thus offer a capability for converting the linear antiparallel motions of the two drive points 38a and 38b along a first direction into a straight-line motion of contact point 32a along a second direction not parallel to the first direction. In particular, as shown in FIG. 1B, the antiparallel motions of the two drive points 38a and 38b along the X axis can thereby be converted into the straight-line motion of contact point 32a along the Y axis. It is of course also possible, in corresponding fashion, to convert a motion of contact point 32a into antiparallel motions of the two drive points 38a and 38b.

Coupling structure 40 depicted schematically in FIG. 1C encompasses a linear oscillator made up of two oscillating masses 42a and 42b (seismic masses) that are coupled to one another by way of a spring 44. The linear oscillator having components 42a, 42b, and 44 is surrounded by a frame of coupling structure 40, which frame is assembled from four angle elements 10a to 10d.

Angle elements 10a and 10b, and components 32a, 34a, 34b, 36a, 36b, 38a, and 38b coacting with them, have already been described above. Further angle elements 10c and 10d are disposed, mirror-symmetrically to angle elements 10a and 10b with respect to an axis of symmetry 46 that is oriented at a 90° angle to axis of symmetry 30. The end of angle element 10c adjacent to angle element 10a is once again connected to contact point 38a by way of a flexural spring 36c. Drive point 38b is also correspondingly connected, by way of a flexural spring 36d, to one end of angle element 10d. In addition, angle elements 10c and 10d, correspondingly to angle elements 10a and 10b, are connected by way of two flexural springs 34c and 34d to a further contact point 32b. Flexural springs 34a to 34d and 36a to 36d may be embodied as soft flexural springs.

The frame of coupling structure 40 thus assembled, which frame surrounds the linear oscillator having components 42a, 42b, and 44, is mirror-symmetrical with respect to axis of symmetry 30 extending parallel to the Y axis, and with respect to axis of symmetry 46 extending parallel to the X axis. The transverse forces of all the coacting springs 34a to 34d and 36a to 36d thus cancel one another out.

As already described above, the two drive points 36a and 36b are caused, by way of a drive system (not depicted), to perform antiparallel oscillating motions that are oriented parallel to the X axis. These oscillating motions of the two drive points 38a and 38b are converted into an antiphase motion, oriented along the Y axis, of the two contact points 32a and 32b. Coupling structure 40 is thus particularly well designed to convert antiphase oscillating motions along a first direction into antiphase oscillating motions along a second direction.

First oscillating mass 42a is coupled to contact point 32a by way of a first connecting component 48a. Second oscillating mass 42d is also correspondingly connected to contact point 32b by way of a second connecting component 48b. The oscillating motions of contact points 32a and 32b excited by the drive system thus produce antiphase oscillating motions of oscillating masses 42a and 42b that are oriented parallel to the Y axis.

Be it noted at this point that coupling structure 40 is designed so that it converts the oscillating motions of drive points 36a and 36b into antiphase oscillating motions of oscillating masses 42a and 42b. The coupling structure thus offers a reliable and economical capability for reliably imparting the desired oscillating motions, by way of a drive system, to oscillating masses 42a and 42b.

Coupling structure 40 can be fixedly disposed on a rotatable object (not depicted). If the object rotates, about a rotation axis not parallel to the Y axis in the context of an antiphase oscillating motion of oscillating masses 42a and 42b, oscillating masses 42a and 42b are deflected by Coriolis forces in opposite directions perpendicular to the Y axis. If the rotatable object is rotating, for example, about the Z axis, the two oscillating masses 42a and 42b then experience deflections along the X axis. A rotation about the X axis correspondingly produces deflections of oscillating masses 42a and 42b along the Z axis.

The deflections of oscillating masses 42*a* and 42*b* in a direction oriented perpendicular to the Y axis can be measured using conventional methods, and can then be converted into at least one variable describing the rotary motion of the object, for example an orientation of the rotation axis and/or a rotation rate. Because evaluation of the deflections of oscillating masses 42*a* and 42*b* in order to define the variable to be ascertained for the rotary motion of the object is known from the existing art, it is not discussed here.

Figure 2:
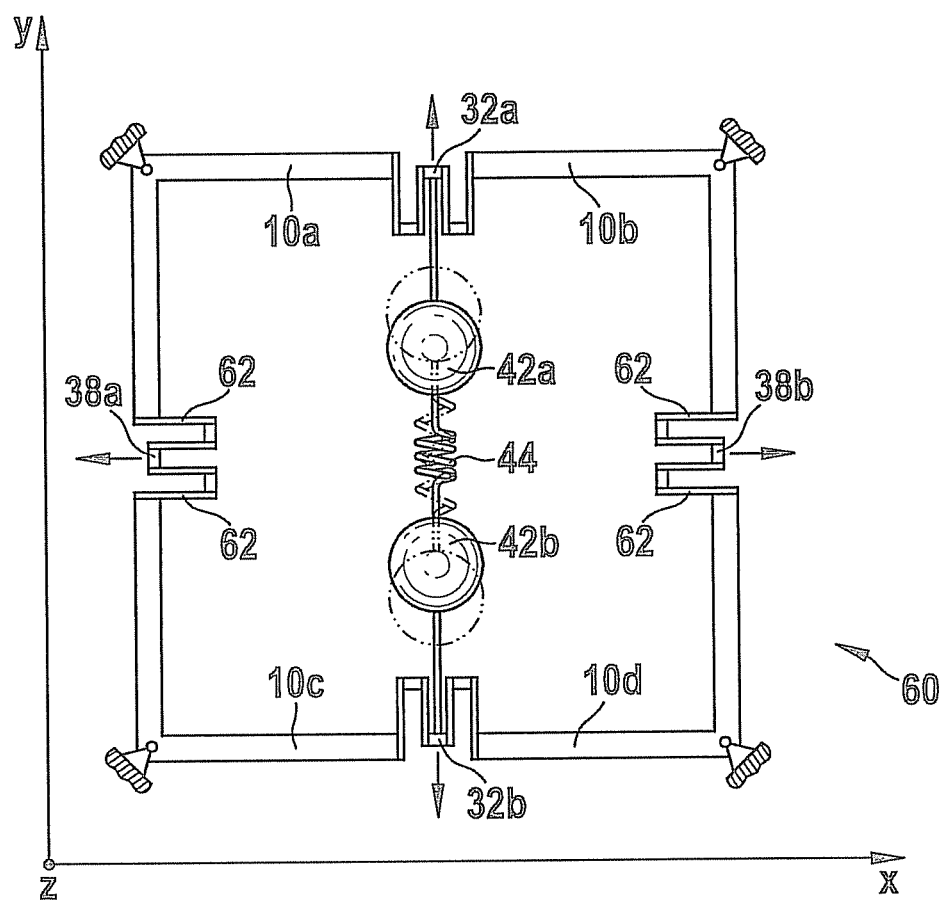
FIGS. 2 to 15 each schematically depict a further embodiment of the coupling structure for a rotation rate sensor apparatus.

FIG. 2 schematically depicts a second embodiment of the coupling structure for a rotation rate sensor apparatus.

Coupling structure 60 depicted therein for a rotation rate sensor apparatus differs from the coupling structure of FIGS. 1A to C in that instead of the flexural springs, U-springs 62 are used to assemble the frame of coupling structure 60. Angle elements 10*a* to 10*d* are otherwise connected to drive points 38*a* and 38*b* and to contact points 32*a* and 32*b* in the manner already described. Coupling structure 60 thus ensures the advantages already described above.

U-springs 62 can be disposed so that at least one of U-springs 62 projects into a frame interior space spanned by the frame. Coupling structure 60 requires less attachment area in this case.

The coupling structures described with reference to FIGS. 1A to C may be used for single-channel rotation rate sensor apparatuses having one sensitive axis. As a rule, using a rotation rate sensor apparatus of this kind it is possible to sense, and evaluate with regard to at least one of its variables, a rotation of a rotatable object about only one predefined spatial axis, which can be referred to as a "sensitive axis."

The coupling structures described hereinafter are suitable in particular for multi-channel rotation rate sensor apparatuses, which are designed to sense, and evaluate with regard to at least one of its variables, a rotation of a rotatable object about at least two sensitive axes.

Figure 3:
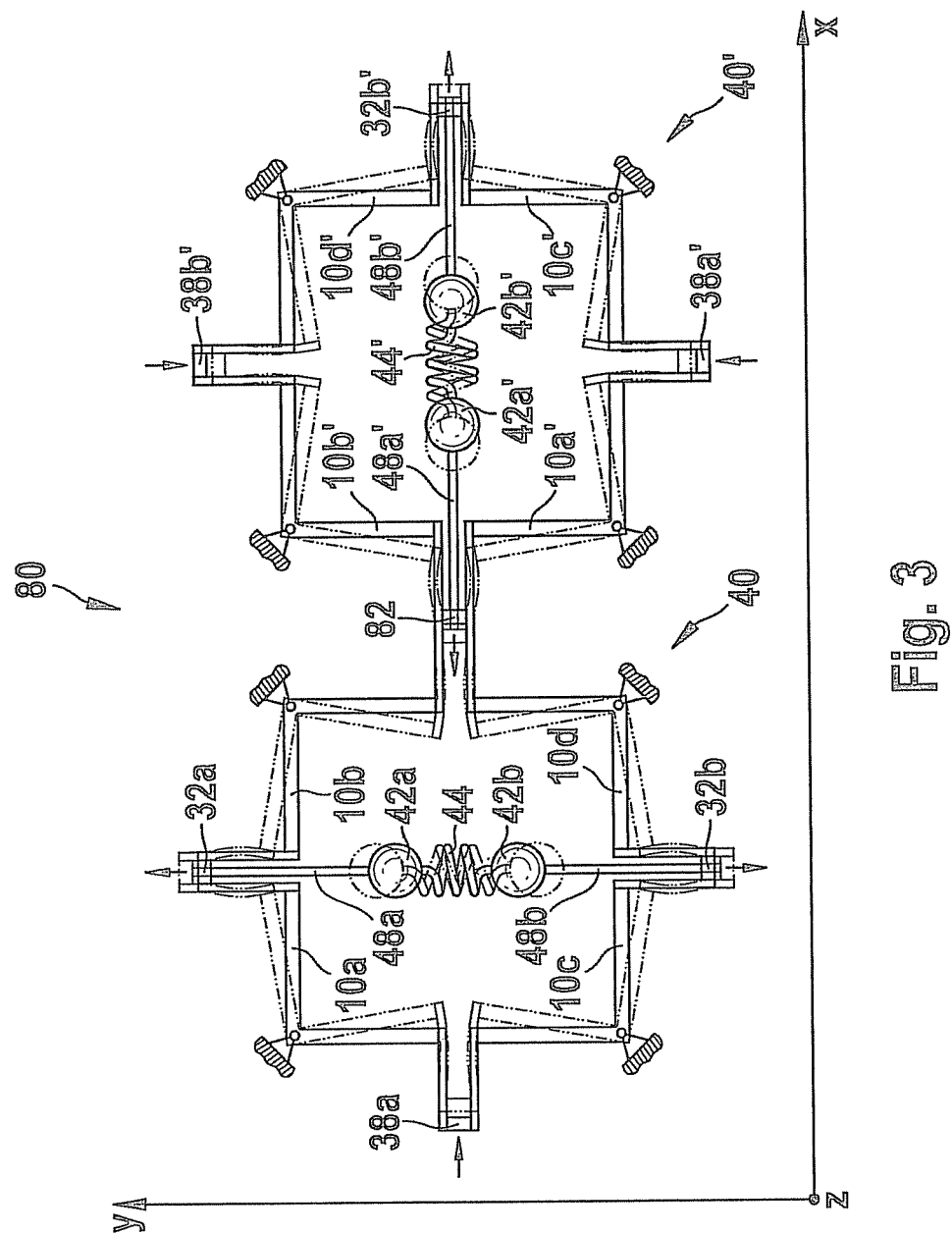

FIG. 3 schematically depicts a third embodiment of the coupling structure for a rotation rate sensor apparatus.

Coupling structure 80 depicted therein for a rotation rate sensor apparatus is a combination of two of the coupling structures 40 and 40' described with reference to FIGS. 1A to C. Coupling structure 40' is disposed with a 90° rotation with respect to coupling structure 40. While oscillating masses 42*a* and 42*b* of coupling structure 40 oscillate parallel to the Y axis, the oscillating motions of oscillating masses 42*a*' and 42*b*' of coupling structure 40' are oriented parallel to the X axis.

Coupling structures 40 and 40' have a common drive and contact point 82 by way of which coupling structures 40 and 40' are coupled to one another. Common drive and contact point 82 functions in the context of coupling structure 40' as a contact point. In the context of coupling structure 40, on the other hand, drive and contact point 82 acts as a drive point. This common drive and contact point 82 ensures coaction of the two rotation rate sensor apparatuses 40 and 40' in such a way that the oscillations of oscillating masses 42*a*, 42*b*, 42*a*', and 42*b*' correspond to one another. In particular, common drive and contact point 82 ensures that the amplitudes of the oscillating motions of oscillating masses 42*a*, 42*b*, 42*a*', and 42*b*' are identical.

Reliable coupling between the two coupling structures 40 and 40' is also ensured by an additional single connecting spring. In addition, this also allows effective prevention of any transfer of interference motions between the two coupling structures 40 and 40'.

The rotation rate sensor apparatus having coupling structure 80 is designed, when the rotation rate sensor apparatus is attached to a rotatable object, to ascertain at least one variable of a rotary motion of the body about two sensitive axes. The rotation rate sensor apparatus having coupling structure 80 can thus be designed so that a rotation of the object both about a first rotation axis and about a second rotation axis oriented perpendicular to the first rotation axis can be identified and detected with regard to their variables. The rotary motion of the object can produce, in this context, a deflection of oscillating masses 42*a* and 42*b* in the XZ plane and/or a deflection of oscillating masses 42*a*' and 42*b*' in the YZ plane. For example, a rotation about the Z axis is identified by way of oscillating masses 42*a* and 42*b*, and a rotation about the Y axis by way of oscillating masses 42*a*' and 42*b*'. As an alternative thereto, a rotation about the X axis can also be measured by way of oscillating masses 42*a* and 42*b*, and a rotation about the Z axis by way of oscillating masses 42*a*' and 42*b*'. A combination of rotation measurements about the X and Y axes is of course also conceivable.

The sensor devices for ascertaining the deflections of the oscillating masses 42*a*, 42*b*, 42*a*', and 42*b*' can be in-plane detection structures and/or out-of-plane detection structures, in accordance with the predefined direction of the deflections to be ascertained. Since sensor and evaluation devices of this kind for detecting the deflections of oscillating masses 42*a*, 42*b*, 42*a*', and 42*b*' and for defining the at least one variable of the rotary motion in consideration of the detected deflections are known from the existing art, they will not be described here.

As an alternative to coupling structure 80 described with reference to FIG. 3, coupling structures 40 and 40' can also be coupled onto one another in such a way that their oscillating masses 42*a*, 42*b*, 42*a*', and 42*b*' oscillate parallel to one another. For example, it is possible with a coupling structure of this kind, in which oscillating masses 42*a*, 42*b*, 42*a*', and 42*b*' oscillate along the Y axis, to ascertain both a rotation about the X axis and a rotation about the Z axis.

Figure 4:
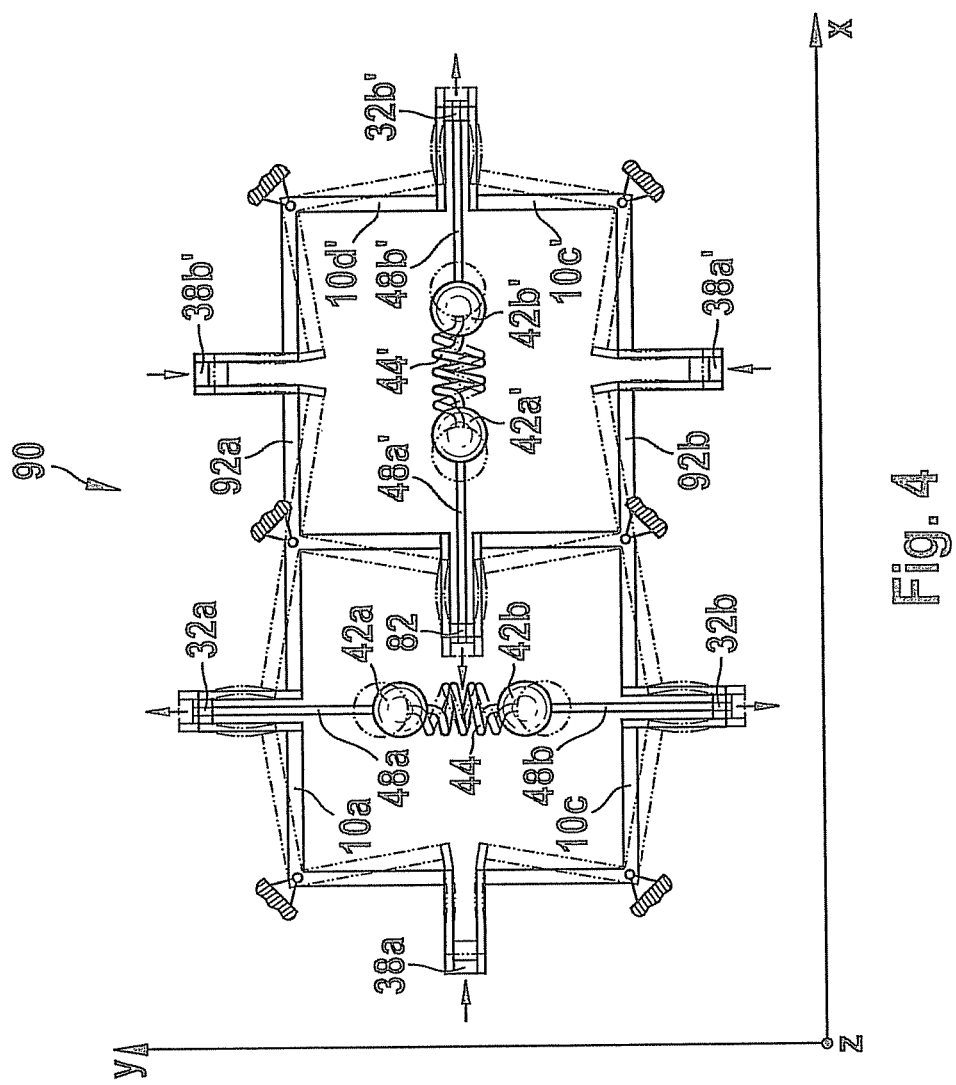

FIG. 4 schematically depicts a fourth embodiment of the coupling structure for a rotation rate sensor apparatus.

Coupling structure 90 depicted in FIG. 4 for a rotation rate sensor apparatus can be referred to as a more compact embodiment of the coupling structure described with reference to FIG. 3. Coupling structure 90 can be formed from the coupling structure of FIG. 3 by replacing angle elements 10*b*, 10*d*, 10*b*', and 10*a*' with two T-shaped angle elements 92*a* and 92*b*.

T-shaped angle elements 92*a* and 92*b* have an additional third limb that is attached, at an inclination angle of between 60° and 120°, to the adjacent limb at the connecting segment. T-shaped angle elements 92*a* and 92*b* may be embodied so that an angle of 90° exists in each case between the first limb and the second limb, and between the second limb and the third limb.

T-shaped angle elements 92*a* and 92*b* are also disposed so that they are rotatable about a rotation axis extending through the connecting segment. T-shaped angle elements 92*a* and 92 thus ensure the utilization capabilities and advantages already described.

In order to replace angle elements 10*b*, 10*d*, 10*b*', and 10*a*' of the coupling structure of FIG. 3, T-shaped angle elements 92*a* and 92*b* are coupled together with the other components in the manner already described above. Coupling structure 90 obtained in this fashion has the advantage that is requires less attachment area in order to perform its function.

Coupling structure 90 ensures a balanced antiphase co-oscillation of oscillating masses 42*a* and 42*b* along the Y axis, along with a simultaneous antiphase co-oscillation of oscillating masses 42*a*' and 42*b*' along the X axis. A rotation rate sensor apparatus having coupling structure 90 is thus designed to identify, after attachment onto a rotatable object, a rotating motion of the object about two mutually perpendicularly oriented rotation axes. In addition, coupling structure 90 is embodied more compactly and therefore has a lower risk of damage.

Figure 5:
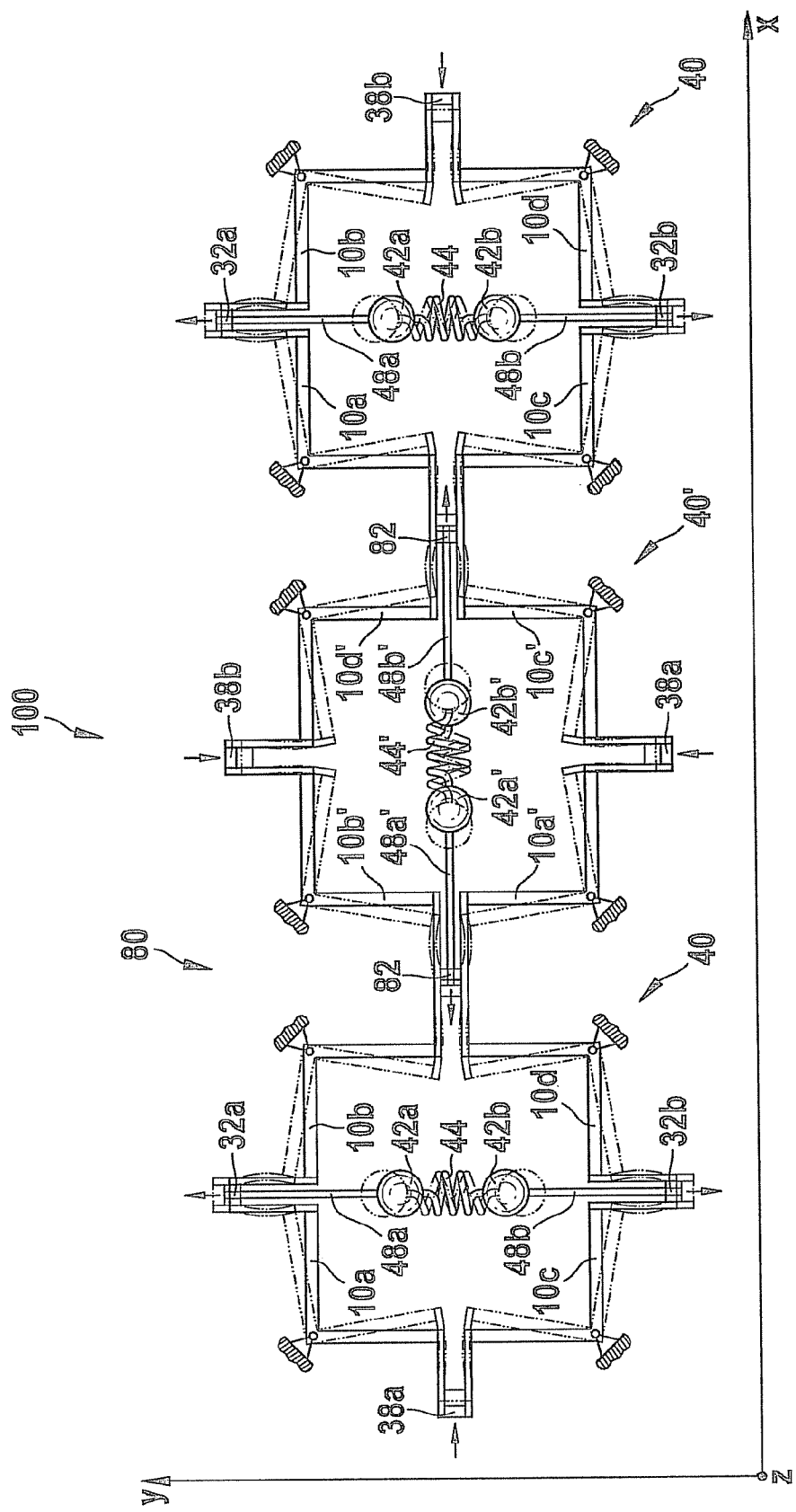

FIG. 5 schematically depicts a fifth embodiment of the coupling structure for a rotation rate sensor apparatus.

Coupling structure 100 depicted in FIG. 5 is well-suited for a three-channel rotation rate sensor apparatus. It can be referred to as a combination of coupling structures 40 and 80 described with reference to FIGS. 1A to C and 3. The total of three coupling structures 40 and 40' are connected to one another via two drive and contact points 82. This ensures that the six different oscillating masses 42a, 42b, 42a', and 42b' of coupling structure 100 adapt to one another in terms of their oscillation behavior. This guarantees in particular that the amplitudes of the oscillating motions of oscillating masses 42a, 42b, 42a', and 42b' are identical.

When an object having coupling structure 100 rotates about a rotation axis, at least two oscillating masses 42a, 42b, 42a', and 42b' are thereby deflected. By way of a suitable sensor device, the deflections of all the oscillating masses 42a, 42b, 42a', and 42b' can be sensed and evaluated with respect to a probable rotary motion of the rotatable object. Because sensor and evaluation devices suitable for this are known from the existing art, they are not discussed here.

Figure 6:
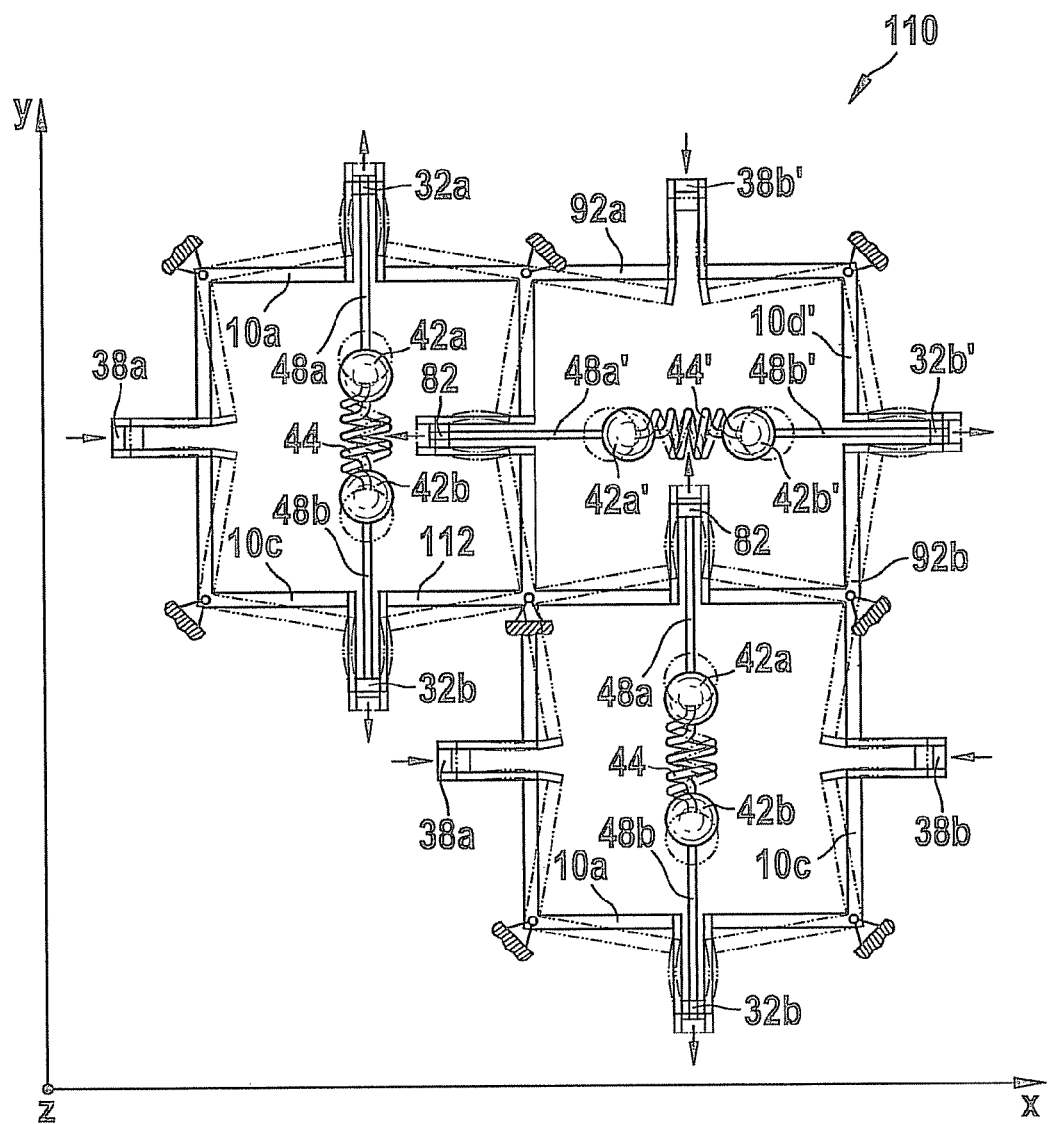

FIG. 6 schematically depicts a sixth embodiment of the coupling structure for a rotation rate sensor apparatus.

Coupling structure 110 for a rotation rate sensor apparatus has a more compact design as compared with the previous coupling structure described with reference to FIG. 5. Coupling structure 110 can be referred to as a combination of coupling structures 40 and 90 of FIGS. 1A to C and 4. The improved compactness of coupling structure 110 is achieved chiefly by the use of a cross-shaped angle element 112 and two T-shaped angle elements 92a and 92b.

Cross-shaped angle element 112 has four limbs, which are disposed fixedly on a connecting segment. An angle of 90° may exist between each two adjacent limbs. Using one cross-shaped angle element 112, at least three angle elements having only two limbs can be replaced. Cross-shaped angle element 112 and the two T-shaped angle elements 92a and 92b ensure adapted oscillation of the total of six oscillating masses 42a, 42b, 42a', and 42b in two different spatial directions (X and Y directions). In this context, each two oscillating masses 42a and 42b or 42a' and 42b' of a linear oscillator oscillate in antiphase with one another. This ensures in particular that the amplitudes of the oscillating motions of oscillating masses 42a, 42b, 42a', and 42b' are identical.

Coupling structure 110 thus also makes it possible to sense, and evaluated by way of its variables, a rotation of a rotatable object in any spatial direction.

Figure 7:
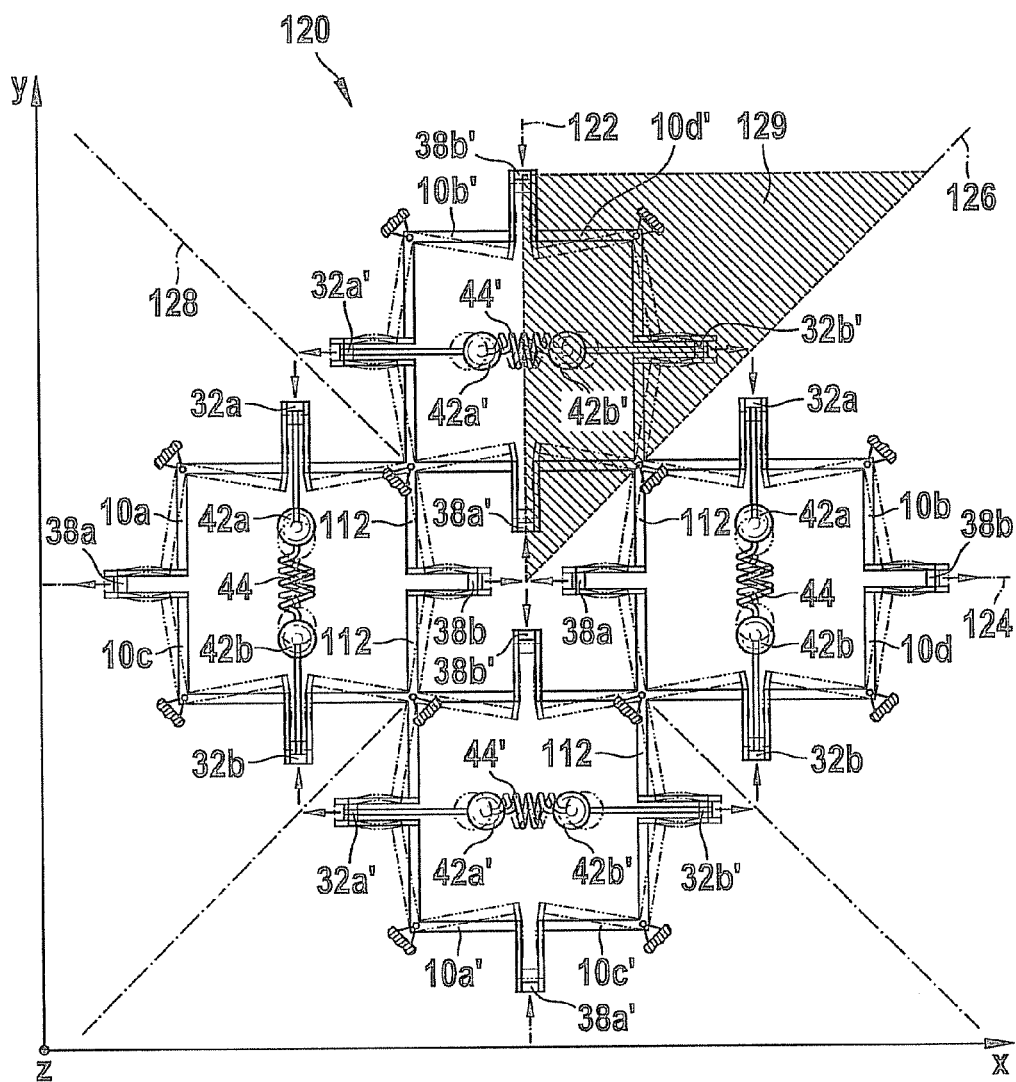

FIG. 7 schematically depicts a seventh embodiment of the coupling structure for a rotation rate sensor apparatus.

Coupling structure 120 reproduced therein for a rotation rate sensor apparatus has a total of eight oscillating masses 42a, 42b, 42a', and 42b', each two oscillating masses 42a and 42b (or 42a' and 42b') being directly coupled to one another by way of a spring 44 (or 44'). Two oscillating masses 42a and 42b coupled to one another are disposed here so that they can perform antiphase oscillating motions parallel to the Y axis. At the same time, coupling structure 120 ensures that two oscillating masses 42a' and 42b' coupled to one another can oscillate respectively in antiphase parallel to the X axis.

Coupling structure 120 can be referred to as a combination of two coupling structures 40 and 40'. The total of four coupling structures 40 and 40' are disposed so that they form the arms of a cross structure, each of the coupling structures 40 and 40' abutting against two adjacent coupling structures 40 and 40'. In order to improve the compactness of coupling structure 120, two oppositely located angle elements having only two limbs can be replaced here by a cross-shaped angle element 112.

Coupling structure 120 is embodied mirror-symmetrically with respect to a first axis of symmetry 122 and a second axis of symmetry 124. There is an angle of 90° between the two axes of symmetry 122 and 124. Rotation rate sensor apparatus 120 furthermore has a third and a fourth axis of symmetry 126 and 128 that exhibit an inclination angle of 45° and an inclination angle of 135° with respect to first axis of symmetry 122.

This mirror-symmetrical embodiment of coupling structure 120 with respect to the four axes of symmetry 122 to 128 ensures that a subregion 129 of rotation rate sensor apparatus 120, located between the first and third axis of symmetry 122 and 126, can be projected eight times. Oscillating mass 42b' located in subregion 129 thus has a spatial environment that is identical to the spatial environment of the other oscillating masses 42a, 42b, 42a', and 42b'. This ensures that oscillating masses 42a, 42b, 42a', and 42b' adapt completely to one another in terms of their oscillating motions.

Rotation rate sensor apparatus 120 is thus particularly well designed for identifying, after attachment to a rotatable object, a rotation of the object about a rotation axis that is not defined in terms of direction in space. In addition, redundancies can also be utilized with such a structure.

Figure 8:
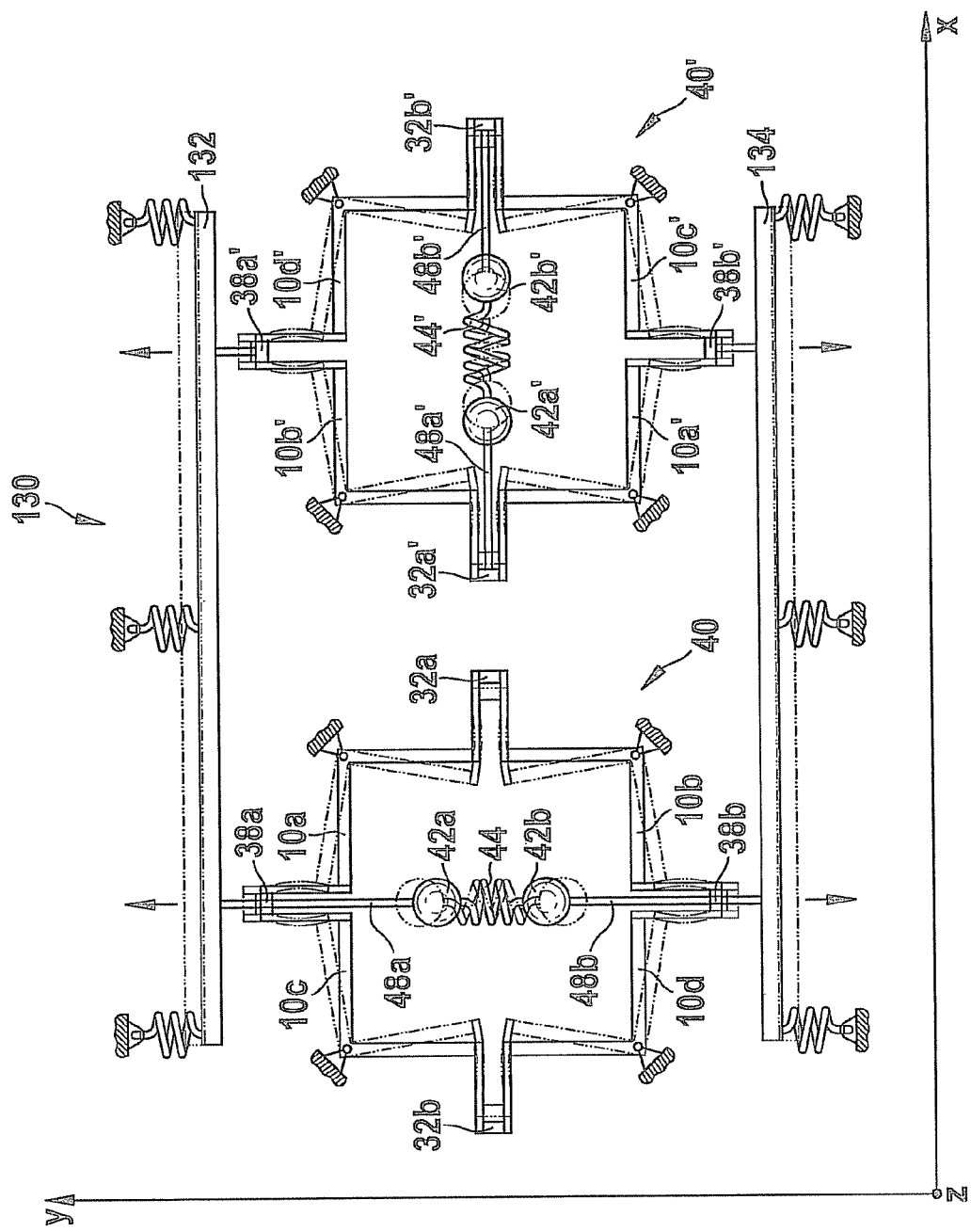

FIG. 8 schematically depicts an eighth embodiment of the coupling structure for a rotation rate sensor apparatus.

Coupling structure 130 for a rotation rate sensor apparatus encompasses two coupling structures 40 and 40' described with reference to FIGS. 1A to C. Coupling structure 40' is disposed with a 90° rotation with respect to coupling structure 40.

Drive points 38a and 38a' of coupling structures 40 and 40' are each coupled to a first beam 132 of coupling structure 130. The coupling of drive points 38a and 38a' to first beam 132 may be embodied so that drive points 38a and 38a' maintain a constant distance from first beam 132. Drive points 38b and 38b' of coupling structures 40 and 40' are correspondingly coupled onto a second beam 134 located opposite first beam 132.

Each of the two beams 132 and 134 can be caused to perform oscillating motions along a direction extending perpendicular to its longitudinal direction. The two beams 132 and 134 may be caused to perform oscillations in such a way that they oscillate antiparallel to one another with a phase difference of 180° (in antiphase). This ensures that drive points 38a and 38b of rotation rate sensor apparatus 40 oscillate in antiphase with one another, and at the same time drive points 38a' and 38b' of rotation rate sensor apparatus 40' are likewise moved in antiphase with one another.

In the case of coupling structure 40, oscillating masses 42a and 42b are mounted, each via a coupling element 48a and 48b, directly on an adjacent contact point 38a and 38b. The oscillating motions of oscillating masses 42a and 42b thus extend parallel to the oscillating motions of drive points 38a and 38b. In particular, oscillating masses 42a and 42b are thereby excited to perform antiphase oscillations.

Oscillating masses 42a' and 42b' of coupling structure 40', on the other hand, are each connected via a coupling element 48a' and 48b' to a respective adjacent contact point 32a' or 32b'. The oscillating motions of drive points 38a' and 38b' along the Y axis are converted into an oscillating motion of oscillating masses 42a' and 42b' along the X axis. Oscillating masses 42a' and 42b' thus also oscillate in antiphase along the X axis.

The easily manufactured coupling structure 130 is thus suitable for a two-channel rotation rate sensor apparatus having an easily embodied drive system that causes two beams 132 and 134 to perform the desired oscillations. This ensures in particular that the oscillating masses 42a, 42b, 42a', and 42b' have the same amplitudes.

Figure 9:
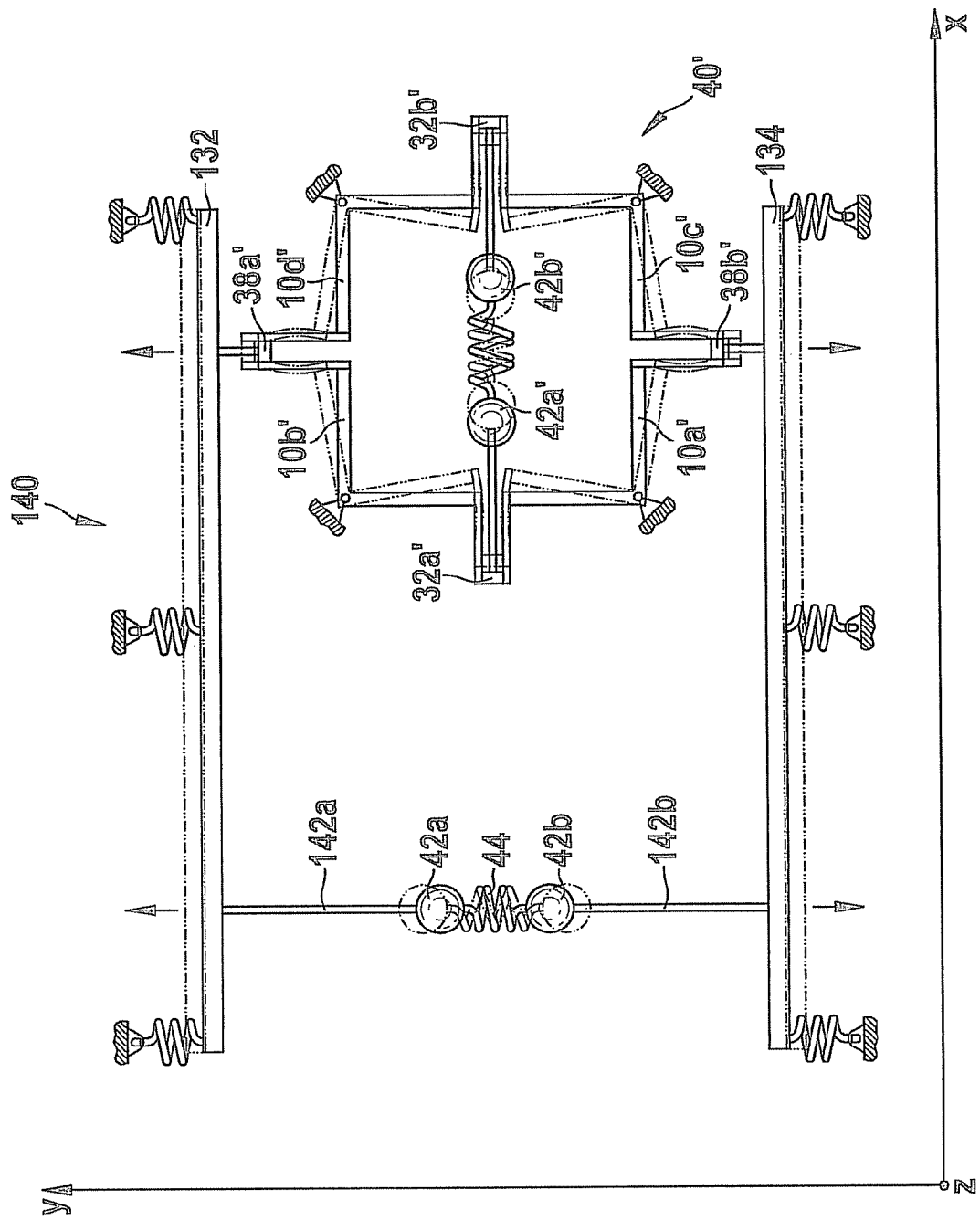

FIG. 9 schematically depicts a ninth embodiment of the coupling structure for a rotation rate apparatus.

The schematically reproduced coupling structure 140 for a rotation rate sensor apparatus is a simplification of the coupling structure described with reference to FIG. 8. Oscillating masses 42a and 42b, which are directly connected to one another via a spring 44, are each directly coupled to an adjacent beam 132 or 134 by way of a coupling element 142a or 142b. The other components of coupling structure 40 are omitted.

Oscillating masses 42a and 42b are thus, by way of the antiphase oscillations of the two beams 132 and 134, directly caused to perform antiphase oscillations along the Y axis. The amplitudes of the oscillating motions of oscillating masses 42a and 42b have, in this context, the same values as the amplitudes of oscillating masses 42a' and 42b'. The advantages already described above are thus also ensured by coupling structure 140, which is more economical to manufacture.

Figure 10:
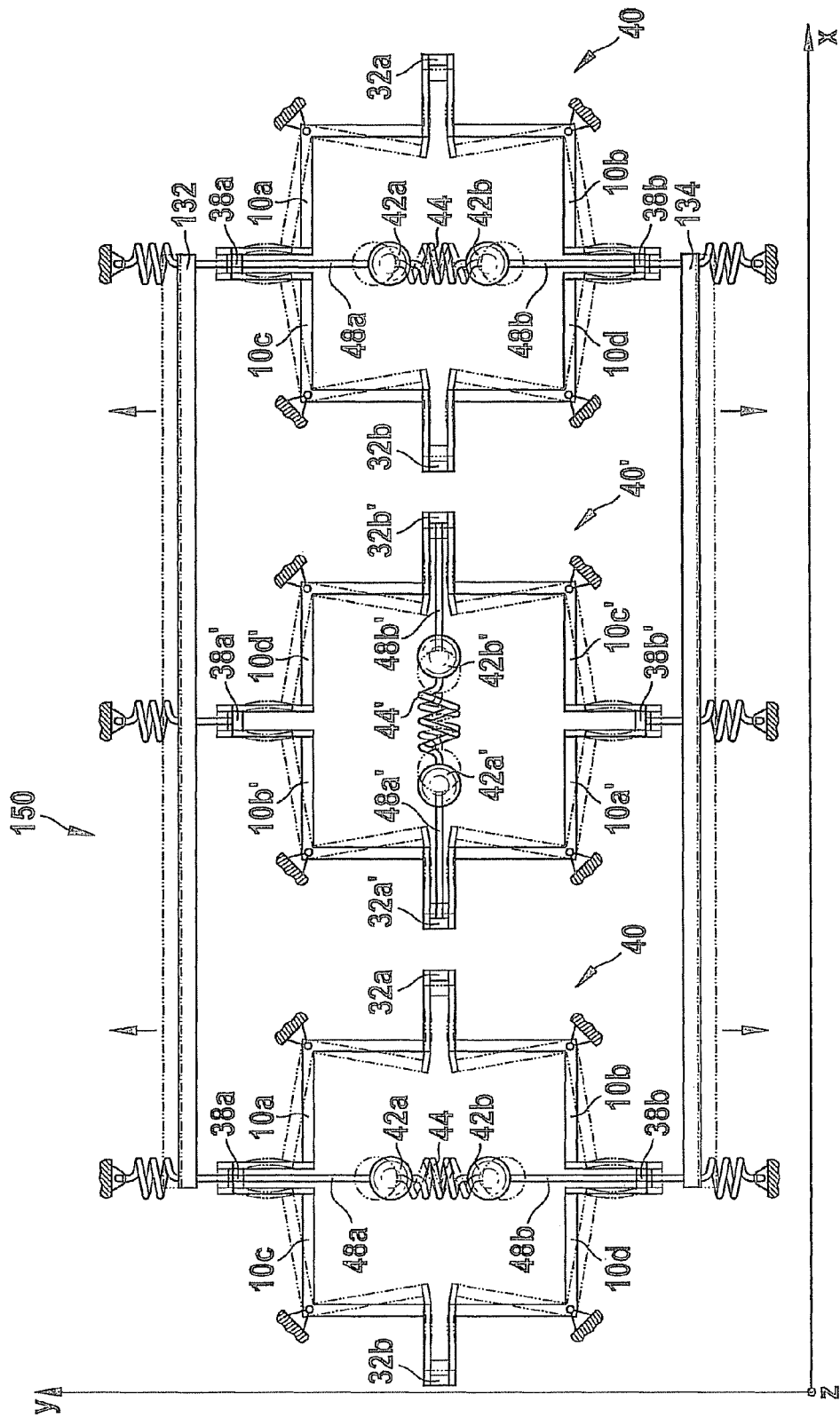

FIG. 10 schematically depicts a tenth embodiment of the coupling structure for a rotation rate sensor apparatus.

Coupling structure 150 depicted therein for a rotation rate sensor apparatus is an expansion of the coupling structure described with reference to FIG. 8. Coupling structure 150 encompasses two coupling structures 40 and one coupling structure 40'. Coupling structures 40 and 40' are each coupled with their drive points 38a, 38b, 38a', and 38b' to beams 132 and 134, in the manner already described above.

Coupling structure 150 enables good conversion of the antiphase oscillations of beams 132 and 134 into the desired oscillations of oscillating masses 42a, 42b, 42a', and 42b' along the X axis or Y axis. The oscillations of the individual oscillating masses 42a, 42b, 42a', and 42b' are thereby adapted to one another. In particular, the oscillating masses 42a, 42b, 42a', and 42b' have the same amplitude as they oscillate.

Oscillating masses 42a, 42b, and 42a', 42b' can be linked directly, or for example also via resilient elements (not shown here), to the respective beams 132, 134 and/or to the substrate.

As will be evident to one skilled in the art from an examination of FIG. 10, it is not necessary to dispose coupling structure 40' between the two coupling structures 40. The two coupling structures 40 can instead also be disposed adjacently to one another.

Coupling structure 150 is suitable for an economical three-channel rotation rate sensor apparatus. In a simplification of coupling structure 150, the frame, constituted from angle elements 10a to 10d, of coupling structures 40 can be omitted, and oscillating masses 42a and 42b can each be coupled directly to the adjacent beam 132 or 134, as has already been explained in the description of FIG. 9. The advantages already described are thus also ensured in the context of an even more economical embodiment of coupling structure 150.

Figure 11:
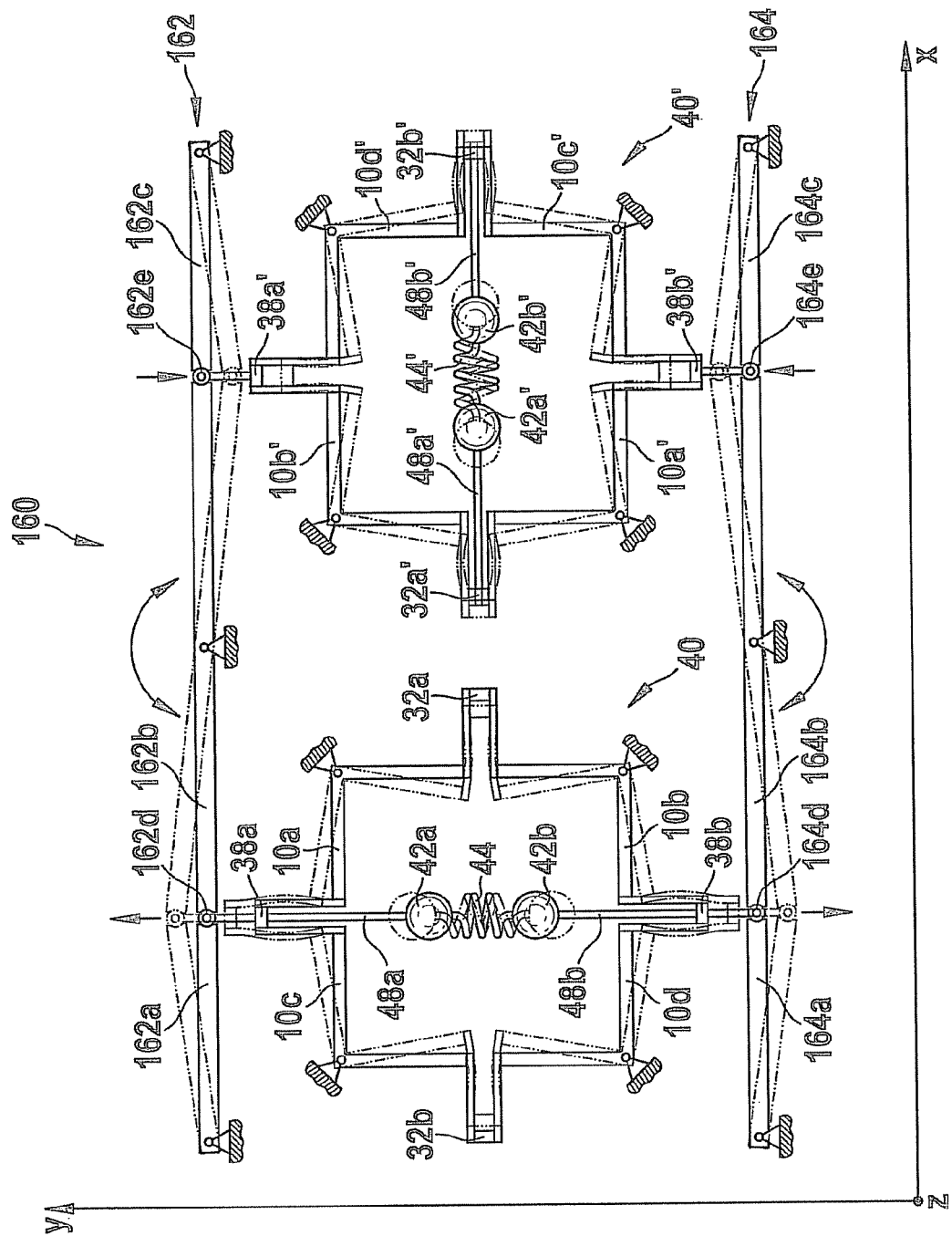

FIG. 11 schematically depicts an eleventh embodiment of the coupling structure for a rotation rate apparatus.

Coupling structure 160 for a rotation rate sensor apparatus differs from the coupling structure described with reference to FIG. 8 by having two rockers 162 and 164 to which drive points 38a, 38b, 38a', and 38b' are coupled.

First rocker 162 encompasses three beams 162a, 162b, and 162c that are connected to one another via two articulations 162d and 162e. Each of the three beams 162a to 162c is mounted on a housing (not depicted) in such a way that each beam 162a to 162c can perform a rotary motion about a rotation axis extending through the respective beam 162a to 162c. Beams 162a to 162c are coupled to one another, by way of articulations 162d and 162e, in such a way that the rotary motions of beams 162a to 162c adapt to one another. The rotary motions of beams 162a to 162c can therefore also be referred to as a rocking motion.

First rocker 162 is designed so that it is displaceable out of its initial position, in which beams 162a to 162c are oriented along a common longitudinal axis and articulations 162d and 162e are located on the longitudinal axis, into a first extreme position in which articulation 162d exhibits a maximum deflection with respect to its initial position in a first direction and articulation 162e exhibits a maximum deflection with respect to its initial position in a second direction opposite to the first direction. Rocker 162 is likewise displaceable out of the initial position into a second extreme position in such a way that articulation 162d exhibits a maximum deflection in the second direction and articulation 162c exhibits a maximum deflection in the first direction.

Second rocker 164 is likewise constructed from beams 164a to 164c and articulations 164d and 164e. The reader is referred to the previous paragraph with regard to the coaction of components 164a to 164e.

Coupling structure 160 encompasses coupling structures 40 and 40' that have already been described. In the case of coupling structure 40, contact point 38a is coupled to articulation 162d, and drive point 38b to articulation 164d. In the case of coupling structure 40', drive points 38a' and 38b' are correspondingly connected to articulations 162e and 164e.

The rocking motions of rockers 162 and 164 thus produce an adapted antiphase oscillation of oscillating masses 42a and 42b with a simultaneous adapted antiphase oscillation of oscillating masses 42a' and 42b' along the X axis. Coupling structure 160, which can be manufactured economically, thus has the advantages already described. In addition, it is comparatively simple to drive rockers 162 and 164 to execute the desired rocking motions.

Figure 12:
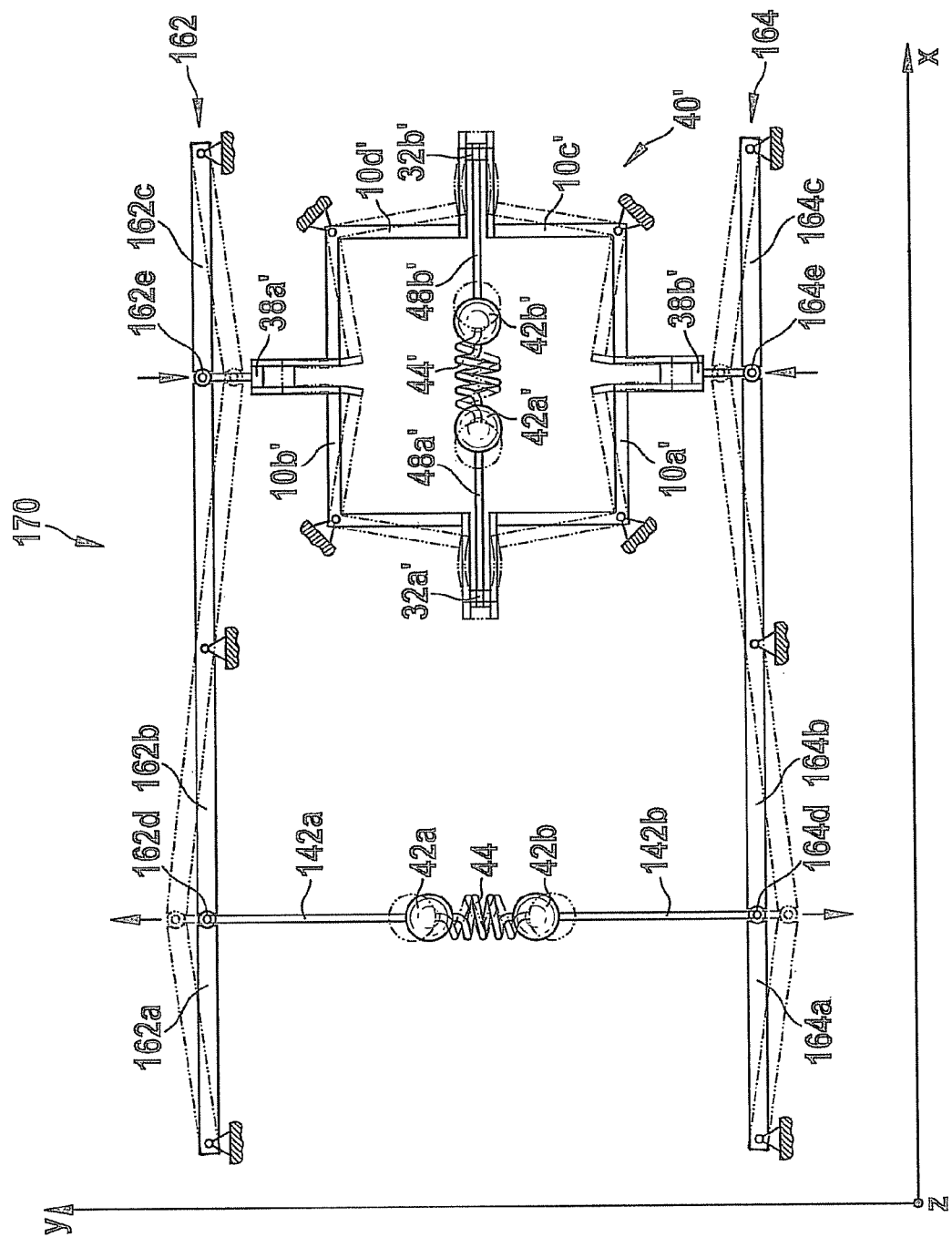

FIG. 12 schematically depicts a twelfth embodiment of the coupling structure for a rotation rate sensor apparatus.

Coupling structure 170 depicted therein for a rotation rate sensor apparatus differs from the coupling structure reproduced in FIG. 11 in that oscillating masses 42a and 42b are coupled directly to articulations 162d and 164d by way of coupling elements 142a and 142b. Reference is made to the previous exemplifying embodiment with regard to the coupling of drive points 38a' and 38b' of coupling structure 40' onto articulations 162e and 164e. Coupling structure 170 thus also offers an economical and easily manufacturable capability for ensuring the advantages described.

Figure 13:
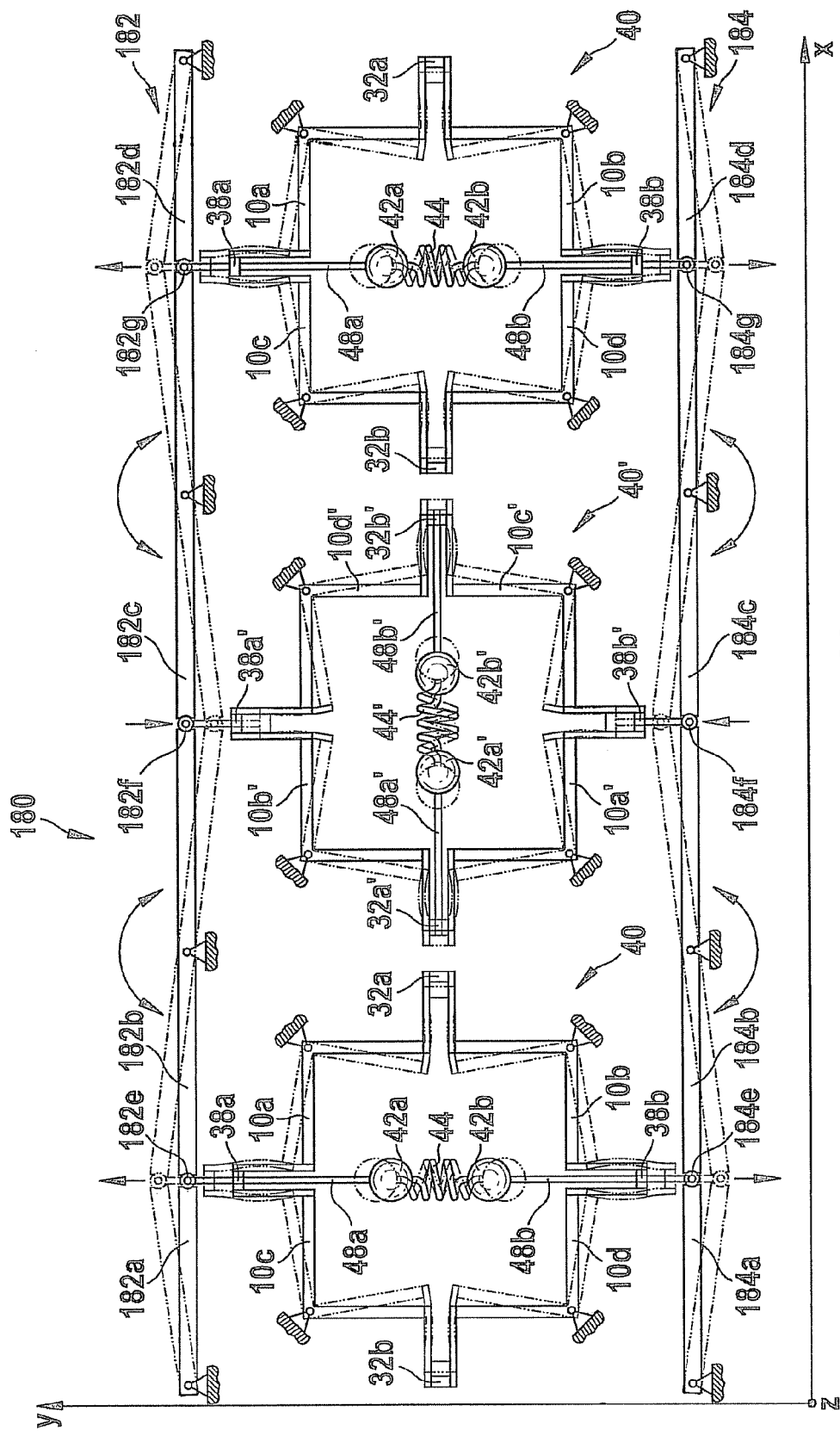

FIG. 13 schematically depicts a thirteenth embodiment of the coupling structure for a rotation rate sensor apparatus.

Coupling structure 180 for a rotation rate sensor apparatus encompasses two coupling structures 40, a coupling structure 40', a first rocker 182, and a second rocker 184. First rocker 182 is made up of four beams 182a to 182d that are connected to one another by way of three articulations 182e to 182g. Beams 182a to 182d can thus be displaced out of an initial position of first rocker 182, in which beams 182a to 182d are oriented along a common longitudinal axis and articulations 182e to 182g are located on the longitudinal axis, into two extreme positions. In the first extreme position of rocker 182, articulations 182e and 182g are maximally deflected out of their initial positions in a first direction. Conversely, articulation 182f in the first extreme position is maximally deflected in a second direction oriented oppositely to the first direction. In the second extreme position of rocker 182 as well, articulations 182e and 182g are deflected oppositely to articulation 182f, articulation 182f being deflected in the first direction and articulations 182e and 182g in the second direction.

Second rocker 184 is correspondingly assembled from components 184a to 184g. It likewise has an initial position out of which articulations 184e to 184g can be displaced into two extreme positions.

As a result of the coupling of drive points 38a, 38b, 38a', and 38b' onto articulations 182e to 182g and 184e to 184g, oscillating masses 42a, 42b, 42a', and 42b' can be excited to perform the advantageous oscillating behavior already described above. In this context, rockers 182 and 184 are excited simultaneously and in antiphase to perform rocking motions. Coupling structure 180, which can be manufactured economically, is thus also designed to ensure the advantages described above.

Coupling structure 180 can be embodied more economically by the fact that masses 42a and 42b are coupled directly onto articulations 182e, 184e, 182g, and 184g. The frames of coupling structures 40 can thus be eliminated.

Figure 14:
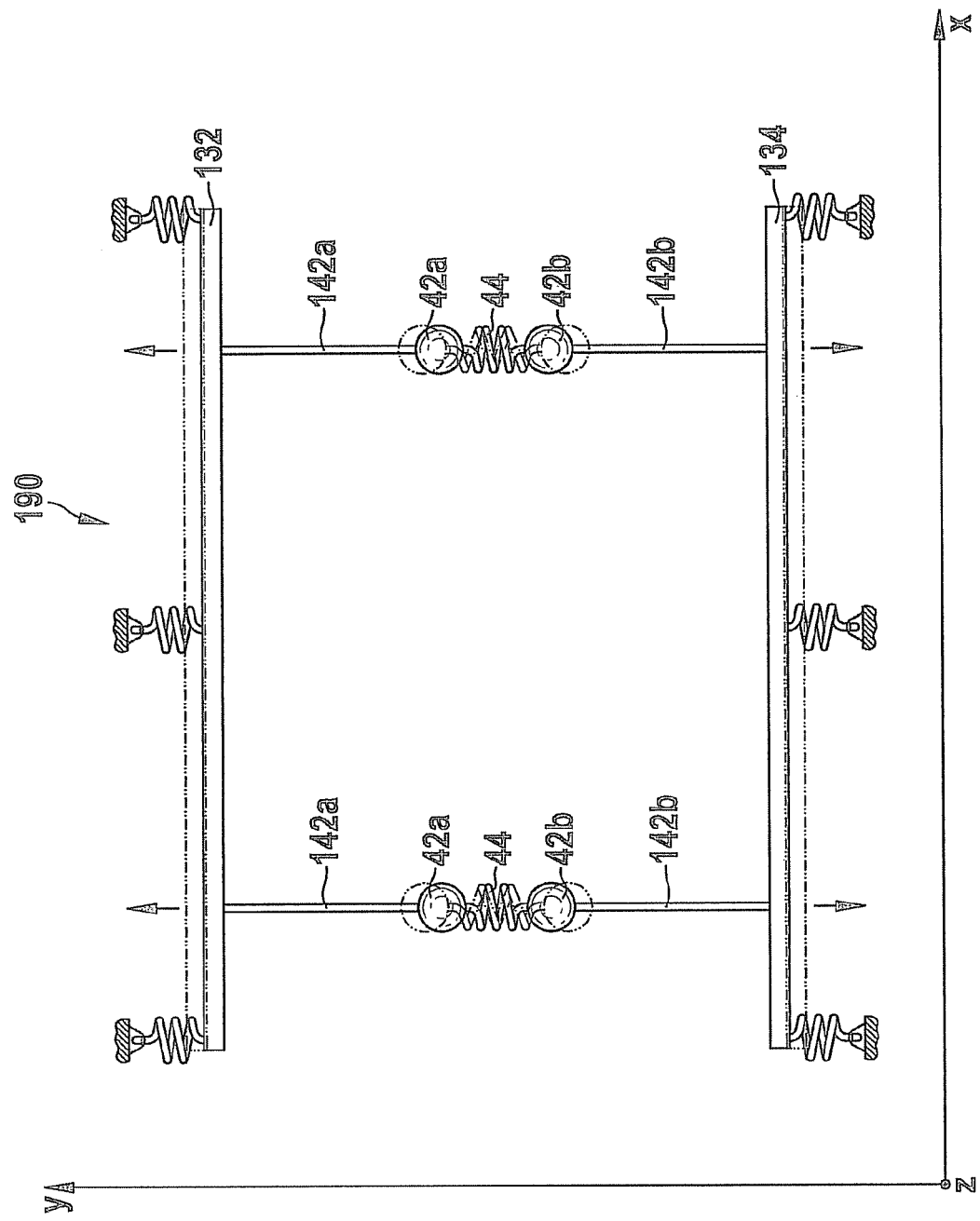

FIG. 14 schematically depicts a fourteenth embodiment of the coupling structure for a rotation rate sensor apparatus.

Coupling structure 190 for a rotation rate sensor apparatus encompasses two beams 132 and 134, oriented along the X axis, onto which two linear oscillators each having two oscillating masses 42a and 42b are coupled. Oscillating masses 42a are mounted directly on first beam 132 by way of coupling elements 142a. Oscillating masses 42b are correspondingly connected to second beam 134 by way of coupling elements 142b.

It is possible to ensure, by imparting antiphase oscillations in easily executable fashion to the two beams 132 and 134, that oscillating masses 42a and 42b of each linear oscillator oscillate in antiphase and with the same amplitude parallel to the Y axis. Coupling structure 190 thus offers an economical capability for a two-channel rotation sensor apparatus that is easy to operate.

Figure 15:
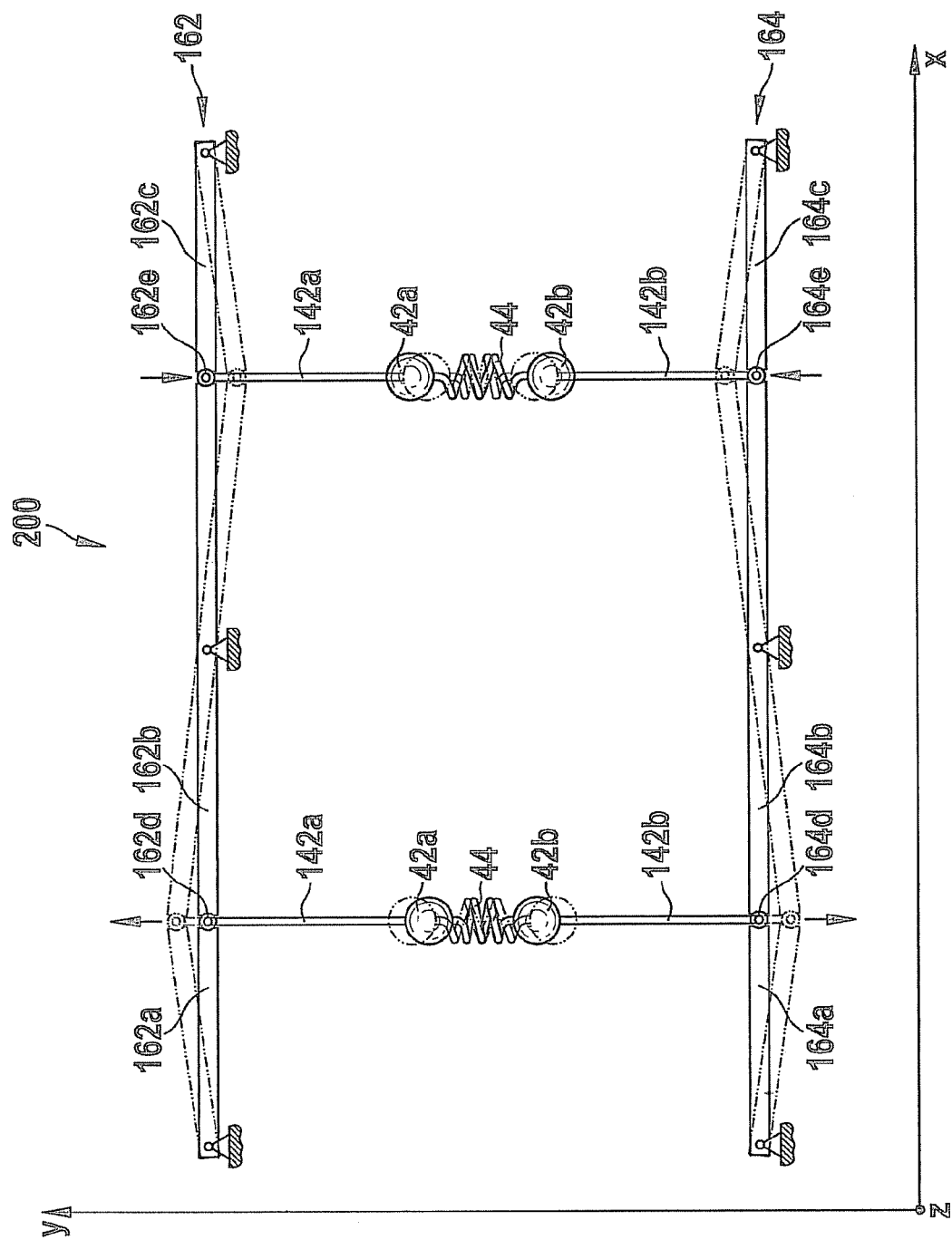

FIG. 15 schematically depicts a fifteenth embodiment of the coupling structure for a rotation rate sensor apparatus.

As compared with the coupling structure of FIG. 14, coupling structure 200 of FIG. 15 has, instead of two beams, a first rocker 162 and a second rocker 164. For a description of the coaction of the individual components 162a to 162e and 164a to 164e of the two rockers 160 and 164, the reader is referred to the description of FIG. 11.

Oscillating masses 42a of the two linear oscillators of coupling structure 200 are coupled directly, by way of coupling elements 142a, to articulations 162d and 162e of the first rocker. Oscillating masses 42b of the two linear oscillators are likewise connected, by way of coupling elements 142b, to a respective articulation 164d or 164e of second rocker 164.

Coupling structure 200 can also be manufactured economically in simple fashion. Coupling structure 200 thus offers an advantageous capability for a two-channel rotation rate sensor apparatus in which the four oscillating masses 42a and 42b are caused to perform oscillating motions, in antiphase and with the same amplitudes, along the Y axis.

All the coupling structures described in the preceding paragraphs can be disposed in an airtight housing with a gas filling or vacuum; a frequency at which the oscillating masses oscillate and/or are damped can be varied by way of the gas pressure.

A rotation rate sensor apparatus having one of the coupling structures described in the preceding paragraphs can be used, for example, in automotive and consumer products.

The invention is not limited to applications in which the limbs of the angle elements are of identical length. The limbs of a particular angle element, or of different angle elements, can instead also be of different lengths.

What is claimed is:

1. A coupling structure for a rotation rate sensor apparatus, comprising:
   at least one first oscillating mass;
   a first frame, surrounding the first oscillating mass, to which the first oscillating mass is coupled;
   wherein the first frame encompasses four angle elements, each of which angle elements has at least one first limb and one second limb and is respectively coupled with the first limb and with the second limb to another adjacent angle element of the four angle elements;
   at least one second oscillating mass; and
   a second frame, surrounding the second oscillating mass, to which the second oscillating mass is coupled and which is constituted from four angle elements coupled to one another,
   wherein at least two angle elements of the first frame and at least two angle elements are coupled, each with one limb, to a common point, to a beam, or to a rocker so that the motions of the two angle elements of the first frame that are coupled to the common point, to the beam, or to the rocker correspond to the motions of the two angle elements of the second frame that are coupled to the common point, to the beam, or to the rocker.

2. The coupling structure of claim 1, wherein each of the angle elements of the first frame is disposed rotatably about a rotation axis and extending through the respective angle element.

3. The coupling structure of claim 1, wherein at least one angle element is a constituent of the first frame and of the second frame, and the angle element (92a, 92b, 112) that is a constituent of the first frame and of the second frame is embodied as one of a T-shaped angle element and a cross-shaped angle element.

4. The coupling structure as recited in claim 1, wherein each angle element is embodied rigidly in that a force less than a breakage threshold results in no change in an angle between the first limb and the second limb of each angle element.

5. A manufacturing method for a coupling structure for a rotation rate sensor apparatus, which is a coupling structure, the method comprising:
   connecting a first oscillating mass to a second oscillating mass via a first spring, and connecting a third oscillating mass to a fourth oscillating mass via a second spring; and
   coupling the first oscillating mass and the third oscillating mass to a first beam device or rocker device, and coupling the second oscillating mass and the fourth oscillating mass to a second beam device or rocker device, the oscillating masses being coupled to the respective beam device or rocker device so that upon a first motion of the first beam device or rocker device that is antiphase with respect to a second motion of the second beam device or rocker device, the first oscillating mass is caused to perform a first oscillating motion that is antiphase with respect to the second oscillating motion that the second oscillating mass is caused to perform;

wherein the coupling structure includes:
the first oscillating mass and the second oscillating mass that are connected to one another via the first spring; and
the third oscillating mass and the fourth oscillating mass that are connected to one another via the second spring, wherein the first oscillating mass and the third oscillating mass are coupled to the first beam device or rocker device, and the second oscillating mass and the fourth oscillating mass to the second beam device or rocker device, so that upon a first motion of the first beam device or rocker device that is antiphase with respect to a second motion of the second beam device or rocker device, the first oscillating mass can be caused to perform a first oscillating motion that is antiphase with respect to a second oscillating motion that the second oscillating mass can be caused to perform.

6. A method for manufacturing a rotation rate sensor apparatus which has a coupling structure, the method comprising:
making a coupling structure by performing the following:
coupling together four angle elements, each of which angle elements has at least one first limb and one second limb, to a first frame, each of the angle elements being respectively coupled, with the first limb and with the second limb, to another adjacent angle element of the four angle elements; and
coupling at least one oscillating mass to the first frame surrounding the oscillating mass;
wherein the rotation rate sensor apparatus, includes:
a coupling structure for a rotation rate sensor apparatus, including:
at least one first oscillating mass; and
a first frame, surrounding the first oscillating mass, to which the first oscillating mass is coupled;
wherein the first frame encompasses four angle elements, each of which angle elements has at least one first limb and one second limb and is respectively coupled with the first limb and with the second limb to another adjacent angle element of the four angle elements; and
a sensor device and evaluation device which is configured, in the context of a first oscillating motion of the first oscillating mass along a first oscillating direction, to identify a deviation motion, brought about by a Coriolis force, of the first oscillating mass in a deviation direction not parallel to the first oscillation direction, and to define an information item with respect to a rotation of the rotation rate sensor apparatus in consideration of the identified deviation motion of the first oscillating mass in the deviation direction.

7. The method as recited in claim 6, wherein each angle element is embodied rigidly in that a force less than a breakage threshold results in no change in an angle between the first limb and the second limb of each angle element.

* * * * *